Oct. 2, 1956 L. A. AMTSBERG 2,765,059
TORQUE CONTROL CLUTCH DEVICE
Filed Sept. 18, 1952 3 Sheets-Sheet 1

INVENTOR:
LESTER A. AMTSBERG
BY
Raymond G. Mullee
ATTORNEY.

United States Patent Office 2,765,059
Patented Oct. 2, 1956

2,765,059

TORQUE CONTROL CLUTCH DEVICE

Lester A. Amtsberg, New Hartford, N. Y., assignor to Chicago Pneumatic Tool Company, New York, N. Y., a corporation of New Jersey Application September 18, 1952, Serial No. 310,298

28 Claims. (Cl. 192—56)

This invention relates to clutch mechanism of the class in which a driving member is directly coupled to a driven member for rotation therewith until the torque attains a predetermined value whereupon the members are automatically separated and held apart to permit the driving member to continue to rotate without subjecting the driven member to further application of torque, thereby protecting the latter against overload. The invention has particular application to portable power operated tools for driving bolts, nuts, screws, studs and the like to the desired degree of tightness.

A conventional form of power wrench has a torque release clutch including toothed clutch members one of which forms a driving clutch member by virtue of direct connection to the tool motor, the driving clutch member being held in engagement with a driven clutch member by means of a compression spring. The clutch teeth are sloped so that during operation, as the torque load increases, the driving clutch member is forced out of engagement with the driven member against the opposing force of the compression spring. When the clutch members are disengaged, a condition which is realized upon attainment of a predetermined torque load, the operator quickly removes the power tool from the driven bolt (or similar fastener) and moves it into operative relation to the next bolt. Usually, a manually operated disengaging clutch interrupts the drive so that no power is transmitted to the wrench socket or tool head except when the entire tool is pressed forward with the socket in engagement with the bolt to be driven.

Power tools as described above are used largely in assembly work on a mass production scale and in such tools the spring type of torque responsive clutch has the advantages of being inexpensive to manufacture, simple in construction, and easy to regulate or adjust. Moreover it permits the entire tool to be of light-weight and small size, and convenient for the operator to handle and control with little effort given to the disestablishment and re-establishment of the driving connection. On the other hand, the usual spring type clutch creates certain problems resulting from the fact that the compression spring exerts a holding force tending to engage the clutch plates at all times. Due to this tendency the engaging faces of the clutch teeth are generally subjected to excessive wear not only in the step of separating under load but especially after the clutch teeth have been disengaged and are moved into re-engagement under the force of the spring. The re-engagement and disengagement continue in rapid succession between the time that the clutch first releases and the time that the operator opens the manual clutch, and during this interval the clutch operates with a series of impacts or rotary hammer blows. This impacting or ratcheting operation occurs under heavy spring pressure and has the undesirable effects of tightening the driven bolt beyond the predetermined torque, shortening the life of the clutch parts which are subjected to the shocks, and of altering the shape of the engaging parts of the clutch teeth to disturb the adjustment for predetermined torque.

The general object of this invention is to retain the advantages of the spring type of torque release clutch but to overcome the usual disadvantages thereof by avoiding excessive wear and the destructive effects of rotary hammer blows.

An object is to cause disengaging movement of the driven clutch plate as well as the driving plate so that if the driving plate is moved forward by the restorative action of the spring, the driven plate will be out of the path in which it would otherwise receive impacts.

A feature of the invention is a booster clutch which holds the driven plate of the torque release clutch in its rearward position as long as torque is transmitted through the booster clutch, but which shifts the driven plate forward out of the path of the driving plate as soon as the driving connection is broken.

Another object is to hold the plates of the torque release clutch in non-driving and non-impacting position as long as necessary but to restore all clutch parts to their original positions at the start of the next operation, with the minimum of attention by the operator.

Another feature of this invention is a snubber arrangement, including a plurality of pawls, which acts as a lock at any stage of the rearward movement of the driving plate to hold it firmly against forward or re-engaging movement until the operator releases the tool from the work piece whereupon the lock is automatically released.

Another feature of the invention is a double taper tooth which minimizes wear on the torque release clutch. Another feature resides in the symmetrical shaping of all clutch elements so that the tool can operate in either direction of rotation.

In order to illustrate the invention one concrete embodiment is shown in the accompanying drawings, in which.

Figures 1, 2, 3, 4, 5, 6, 7, 8, 9, 10, 11:
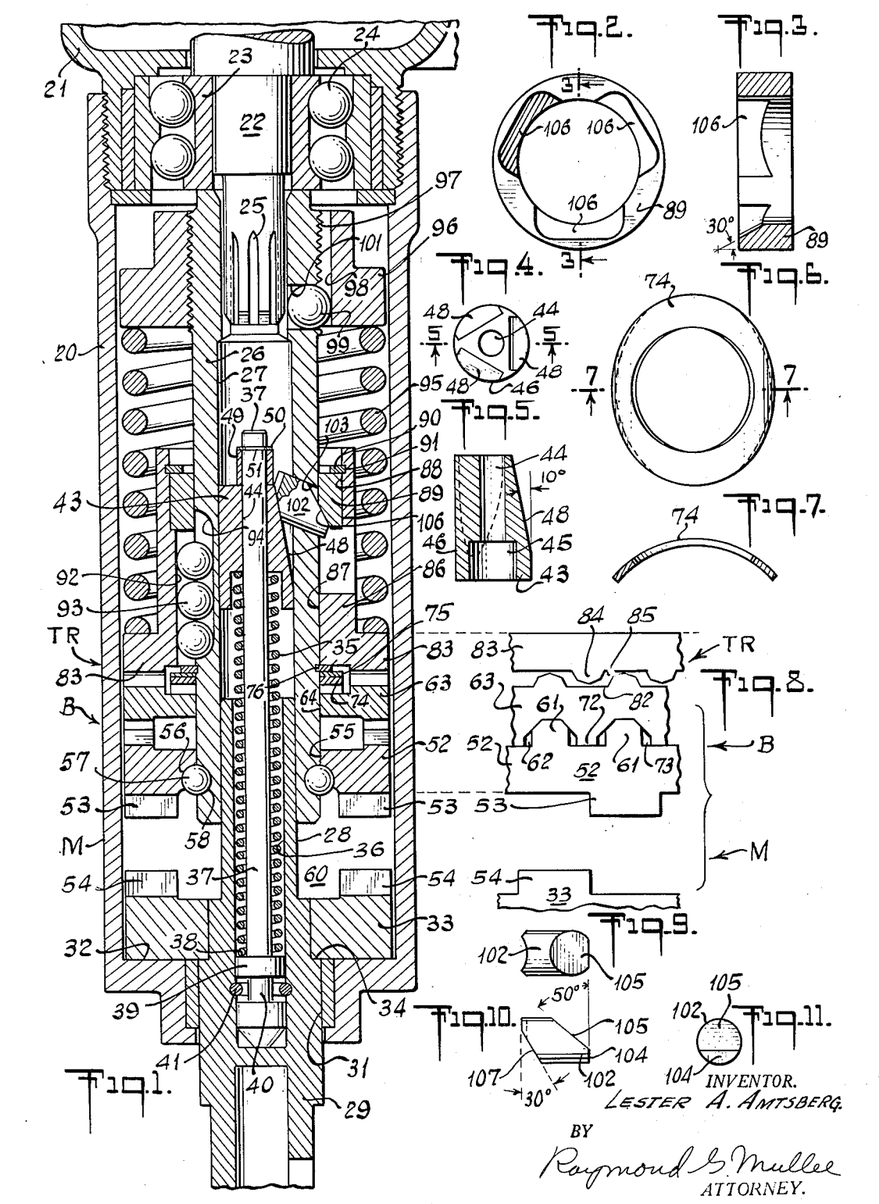
Fig. 1 is a longitudinal sectional view disclosing the clutch device and a fragmentary portion of a machine to which it is attached, with the parts in the idle position.
Fig. 2 is a bottom view in elevation of the cam ring forming part of the snubber shown in Fig. 1.
Fig. 3 is a cross-section of the cam ring as indicated by the arrows 3 in Fig. 2.
Fig. 4 is a plan view of the wedging ring forming part of the snubber shown in Fig. 1.
Fig. 5 is a longitudinal section of the wedging ring, as indicated by the arrows 5 in Fig. 4.
Fig. 6 is a plan view of the curved spring washer which tends to hold the booster clutch in its fully meshed condition.
Fig. 7 is a section of the curved spring washer as indicated by the arrows 7 in Fig. 5.
Fig. 8 is a fragmentary development showing the elements of the torque release clutch, booster clutch and manual clutch in the normal inoperative position of the machine, corresponding to the position shown in Fig. 1.
Fig. 9 is a plan view of the pawl forming part of the snubber shown in Fig. 1.
Fig. 10 is a view of the pawl in side elevation.
Fig. 11 is an elevational view of the pawl, looking at the right end in Fig. 10.

Referring to Fig. 1, the illustrative clutch device is enclosed within a housing 20 having a threaded connection at its end with the gear case 21 of a portable tool preferably powered by a pneumatic or electric motor operating through speed reducing gears, not shown. The parts of the tool which are not illustrated may be conventional, but preferably they would include a flywheel on the motor shaft, also a transmission for driving the spindle 22 at a relatively high speed, inasmuch as the present invention enables the clutch device to take advantage of high speed and high inertia without the usual accompanying disadvantages. The tool spindle 22 is supported for rotation in a sleeve 23 forming part of a ball bearing 24, but is prevented from axial movement relative to gear case 21 and clutch housing 20. The front end of the spindle 22 has a splined connection 25 with a tubular drive shaft 26 whose rear extremity is seated on the front extremity of the sleeve or inner raceway element 23 of ball bearing 24.

Forwardly of the splined portion 25, the drive shaft 26 has an elongated bore 27, the front end of which bore receives, with a rotating and sliding fit, a tubular driven shaft 28 which extends beyond the front end of the housing 20 to form a tool head 29. A bushing 31, seated in a recess in the front wall 32 of the housing, provides a bearing for the tool head. The tool head 29 may be provided with any suitable means (not shown) for attachment to a wrench socket or chuck by means of which rotation is imparted to the work piece, i. e., the driven nut, bolt or screw (not shown).

The clutch device of the present invention comprises a series of clutches arranged coaxially with the drive shaft 26 and surrounding the latter. They include a torque release clutch TR, an auxiliary or booster clutch B and a manually controlled clutch M, all enclosed within the housing 20. The manual clutch M comprises a driven element 33, rigidly secured as by a press fit to the driven shaft 28 which it surrounds. The front end of the driven element or clutch plate 33 abuts against a shoulder 34 on the tool head.

Yieldable means are provided for urging the tool head 29 forward relative to the housing 20, so that in the idle position shown in Fig. 1, the front face of the driven plate 33 of the manual clutch M is seated against the rear end of bushing 31, and also against the inside face of the front wall 32 of the housing. The yieldable or resilient means comprise a helical expansion spring 35 within a bore 36 in the tubular driven shaft 28. Spring 35 surrounds a plunger rod 37 and the front end of the spring rests against a shoulder 38 on a head 39 which is formed at the front portion of the plunger rod. The front extremity of the head seats against the forward or closed end of the shaft bore 36. The head 39 has an annular recess 40, to receive a retainer 41 which is affixed to shaft 28 within the shaft bore 36 as shown.

The rear end of the spring 35 seats against a wedging ring 43. As shown in Figs. 1, 4 and 5, the wedging ring has a coaxial bore 44 slidably fitting the plunger rod 37, a counterbore 45 into which the spring extends, a cylindrical portion 46 having a sliding fit with the shaft bore 27 and three flat faces 48 tapering rearwardly and angularly disposed in the relation of a symmetrical triangular pyramid. The rear extremity of the wedging ring 43 is adapted to seat, in the idle position of the machine, against a collar 49 mounted on the plunger rod and held against displacement by any suitable means such as a split retainer ring 50 embracing a groove 51 in plunger rod 37.

*Manual clutch*

The manual clutch M also includes a driving element or plate 52 having conventional jaws 53 in circumferential spaced relation to each other and projecting forwardly from the driving plate toward corresponding jaws 54 which project rearwardly from the driven plate 33. The driving plate 52 has a bore 55 which receives the drive shaft 26 with a rotating fit and, at the front end of the bore has a raceway 56 seated against a ball thrust bearing 57 in a raceway 58 in driving shaft 26.

In the idle position of the machine as shown in Fig. 1, the driving and driven plates of the manual clutch M are spaced axially apart with the jaws 53 and 54 out of driving engagement. Likewise, the front extremity of the drive shaft 26 is spaced a considerable distance from the clutch driven plate 33. In this position of the parts the motor may be started to rotate the drive shaft 26 and clutch driving plate 52 without imparting rotation to the clutch driven plate 33 and tool head 29. The operator then seats the tool head against the bolt, nut or screw to be driven, and presses the casing 20, 21 of the entire tool or machine toward the work in opposition to the pressure of spring 35, thereby engaging the manual clutch M, and thus moving the parts to the relative positions shown in Figs. 1a and 8a, with the driving and driven plates 52 and 33 and the tool head all rotating in unison. To permit such engaging movement without unnecessarily increasing the length of the machine, the clutch jaws are disposed far enough from the axis of rotation to provide a space 60 into which the front end of the drive shaft 26 may project.

*Booster clutch*

Figure 12:
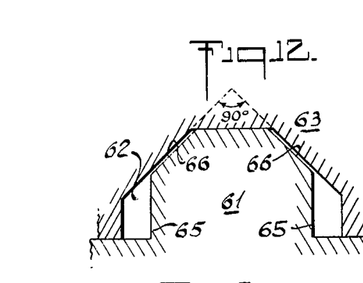
Fig. 12 is an enlarged fragmentary view of the booster clutch showing a tooth completely enclosed in its mating groove under no-load or light-load condition.
Figure 15:
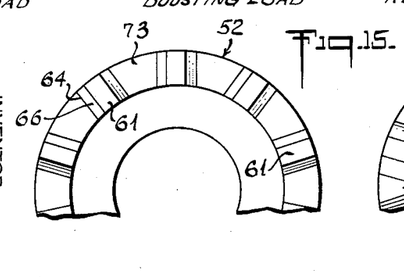
Figs. 15, 16 and 17 are partial face views of the driven teeth of the booster clutch, the driving teeth of the booster clutch, and the driven teeth of the torque release clutch respectively.
Figure 16:
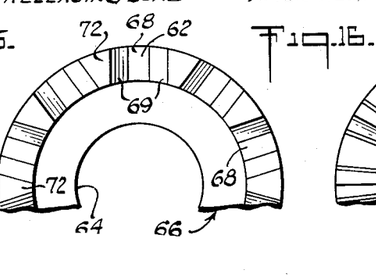

The booster clutch B has as its driven element the same clutch plate 52 which forms the driving element of the manual clutch M, and which is hereinafter sometimes referred to as the front plate. The rear face of the plate 52 is provided with a plurality of circumferentially spaced teeth or ribs 61 which project into cooperating grooves 62 in a driving element embodied in an intermediate plate 63. The latter is disposed rearwardly of the front plate 52 and has a bore 64 which receives the drive shaft 26 on which it is fitted for rotary and limited axial movement relative thereto, as shown in Figs. 1a to 1e inclusive. The ribs or teeth 61 are radially arranged and each rib is provided with a root portion having opposite side faces 65 which are in planes parallel with each other and with the axis of rotation. Projecting rearwardly from the root portion of rib 61 is a tapered or sloping portion having its opposite sides or faces 66 converging rearwardly from the root portion to a flat crest 67 as illustrated on a large scale in Figs. 12 and 13. The associated grooves 62 in the intermediate plate 63 are so shaped that under no-load conditions as shown in Figs. 1, 8, 8a, 8d and 8e, the sloping faces 66 and flat crest 67 are engaged over their entire areas with corresponding congruent surfaces in the groove. The latter surfaces comprise a bottom wall 68 coextensive in area with the tooth crest 67 and a pair of sloping side walls 69 which extend from the end wall to a pair of parallel walls 71, defining the open end of the groove. In the illustrative form of invention the side walls 69 in groove 62 are each inclined at an angle of 45 degrees forming an included angle of 90 degrees as indicated in Fig. 12. The sloping side faces 66 of the rib or tooth 61 are inclined by the same amount but do not extend as far from the vertex as the side walls 69, thereby leaving a space between the parallel walls 65 of the tooth and the parallel walls 71 of the groove.

Figure 8A:
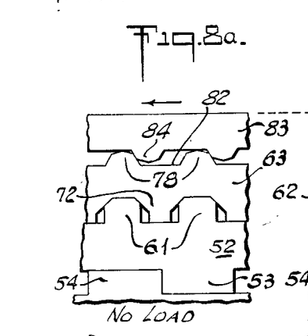
Figs. 8a to 8e are fragmentary views similar to Fig. 8 but with the parts in the position shown in Figs. 1a to 1e respectively.

The portions of intermediate clutch plate 63 which lie between the grooves 62 constitute driving clutch teeth 72 whose front ends normally rest on the flat bottoms of grooves 73 separating the teeth 61 on the driven plate, the position of the parts being as shown in Figs. 8a and 12. Under increased load, however, the sloping side wall 69 of the intermediate plate 63 climbs up the sloping side face 66 of the driven tooth 61 until there is a partial separation between the booster driving and driven plates 63 and 52, after which the straight wall 71 drives the root portion 65 of the tooth in a positive non-slipping manner. Thus the engaging walls 66 and 69 provide cam elements tending to disengage the plates. Referring to Figs. 1, 6 and 7, the booster clutch B is normally held in the fully engaged position by means of a light spring 74 of the curved washer type which is interposed between the rear face of the intermediate plate 63 and a washer 75, the latter being seated against a split ring 76 mounted in a circumferential groove in the drive shaft 26.

Torque release clutch

Figure 17:
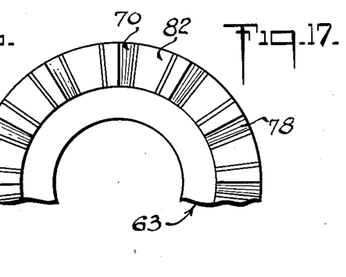

The intermediate plate 63, which constitutes the driving element of the booster clutch B, is so constructed at its rear end that it also constitutes the driven element of a torque release clutch TR. To this end the rear face of plate 63 is provided with a set of driven teeth 78, circumferentially spaced as shown in Fig. 17. Referring also to the enlarged illustration in Fig. 14, each tooth 78 has a root portion provided with slanting side faces 79 and has a tip provided with faces 80 which extend from the side faces 79 and meet in a crest 81 which is arranged radially as shown in Fig. 17. In the illustrated embodiment, the side faces 79 are inclined at an included angle of 60 degrees, while the tip faces 80 taper at an included angle of 150 degrees. Segmental grooves 82 separate the teeth. The intermediate plate 63 cooperates with a rear plate 83 which constitutes the driving element of torque release clutch TR and which has driving teeth 84 and grooves 85 corresponding in size and shape with the driven teeth 78 and grooves 82 respectively. The driving and driven teeth 84 and 78 constitute inter-engaging cam means tending to disengage plates 83 and 63 under load. Within the circumferential rows of teeth 78 and 84 the plates 63 and 83 are recessed to provide clearance for the spring 74 and washer 75. In the idle condition of the machine, and during part of the operation, the plates 63 and 83 of the torque release clutch are held together with the crest of the teeth on one plate just touching the bottom of the grooves between the teeth on the other plate. The means for mounting the rear plate 83 and for urging it forward against the intermediate plate 63 will now be described.

Rear plate 83 has a rearward extension 86, a central bore 87 and a rearwardly open counterbore 88. The bore is fitted for relative longitudinal movement on drive shaft 26, and the same is true of a bushing or cam ring 89 which is secured to the extension 86, being mounted in the counterbore 88. A split ring 90, expanded into an annular recess 91 in the couterbore 88, provides a retainer for the bushing 89. In order to provide a splined driving connection between the shaft 26 and the clutch plate 83, the bore 87 is provided with a plurality of longitudinal grooves 92, only one of which is shown, each groove being of arcuate shape to cooperate with the series of balls 93 riding in a similar groove 94 in the drive shaft 26.

The driving plate extension 86 is surrounded by a helical compression spring 95 whose forward end seats against the main part of the clutch driving plate 83 and whose opposite end seats against an adjusting collar 96. The collar has a screw connection 97 with the shaft 26 whereby the collar on being turned may regulate the compressive force of the spring 95. In order to lock the collar in adjusted position on shaft 26, the collar is provided with a series of circumferentially spaced longitudinal grooves 98 (one being shown), each adapted selectively to receive a locking ball 99 projecting from a radial bore 101 in the shaft. In the assembled condition of the parts as shown in Fig. 1, the collar 96 is prevented from accidentally turning on the shaft by virtue of the locking engagement of the ball 99 with the periphery of the motor spindle 22. When the parts are disassembled however, and the driving shaft 26 is separated from the motor spindle, ball 99 may move inward to permit collar 96 to be turned. Spring 95 provides an adjustable force normally holding plate 83 in its most forward position seated against the intermediate plate 63.

Snubber

As will be described hereinafter, the rear plate 83 of the torque release clutch TR has a tendency to move rearward along driving shaft 26 in response to increased torque and against the pressure of spring 95, until the driving connection between teeth 84 and 78 is broken and the rear plate 83 rotates independently of the intermediate plate 63. Due to the compressive force of the spring 95, the driving plate 83 tends to move axially into re-engagement following release; and in order to inhibit such movement, a snubber is provided. The snubber is interposed between the shaft 26 and the rear clutch plate 83 and is arranged to permit movement of plate 83 rearward on the shaft 26, but to prevent the plate from moving forward until such time as the snubber is disabled under manual control. In oher words, the snubber is designed to act as a hold out device having sufficient strength to retain the driving teeth 84 completely out of the path of the driven teeth 78, thereby preventing successive disengagement and re-engagement in a destructive hammering action.

Referring to Figs. 1, 9, 10 and 11, the snubber includes three equally spaced pawls 102 (one being shown), each of generally cylindrical shape and mounted in a cylindrical bore 103 in the wall of the drive shaft 26. The axis of bore 103 is generally radial with respect to shaft 26 but inclines rearwardly and inwardly by an angle of 20 degrees to a radial line, as shown in Fig. 1d. At its outer end the pawl 102 has a flat face 104 in a plane normal to the axis of the pawl. At the outer rear corner of pawl 102 is a cam face 105 (see Fig. 10) disposed in a plane inclined 50 degrees with respect to the normal face 104 or 40 degrees with respect to the axis of the pawl. Cam face 105 fits a cooperating cam face 106 at the lower and inner edge of the bushing or cam ring 89 as shown in Figs. 1, 2 and 3. Cam faces 105 and 106 engage each other in a plane inclined rearwardly and inwardly at an angle of 30 degrees to the axis of drive shaft 26 (Fig. 1d). The arrangement is such that pawl 102 resists forward movement of bushing 89, while cam ring 89, under the influence of spring 95, opposes outward movement of the pawl along the inclined bore 103. For opposing inward movement of pawl 102 and urging outward movement thereof, cam faces 107 (Fig. 10) and 48 (Fig. 5) are provided on the inner front corner of each pawl and on the outer faces of wedging ring 43 respectively. These cam faces engage each other in a plane inclined 60 degrees to the axis of the pawl or 10 degrees with respect to the axis of drive shaft 26.

Operation

The operation of the tool will now be described starting with the assumption that the operator holds the tool detached from the work with the motor off and the parts in the position shown in Fig. 1. In this condition, the torque release clutch TR is engaged because the rear plate 83 is seated against the intermediate plate 63 in its most forward position under the force of the heavy compression spring 95. The auxiliary separating device or booster clutch B is also engaged due to the action of the light curved washer spring 74 which acts independently of spring 95 to push the intermediate plate 63 forward as far as it will go into contact with the front plate 52, the latter being seated at all times against the ball thrust bearing 57. The manual clutch M is open due to the action of disengaging spring 35 in pushing the driven plate 33 of the manual clutch forwardly of the housing 20 and thereby out of the path of the front plate 52, the other end of the spring reacting against the wedging ring 43, pawl 102, drive shaft 26, sleeve 23 and ball bearing 24 to the housing 20. The operator then starts the motor (not shown), thereby initiating rotation of the spindle 22 which drives the tubular drive shaft 26, ball spline connection 93, 92, rear plate 83, intermediate plate 63 and front plate 52, all of which rotate in unison but without driving the tool head 29 since the manual clutch M is open.

The operator then applies the tool head 29 to the bolt or nut (not shown) to be driven, and manually presses the tool housing 21, 20 forward toward the work, against the pressure of the pre-compressed disengaging spring 35. In a relative sense, the driven plate 33 of the manual clutch M is pushed rearward in the housing thereby engaging the teeth 53 and 54 to initiate rotation of the plate 33 in unison with the other clutch plates. The parts are then in the position shown in Figs. 1a and 8a, in which it is assumed that they are driving a bolt with no appreciable resistance to rotation. Movement of the tool head 29 rearwardly of the housing 20 unseats the plunger rod collar 49 from the wedging ring 43. The latter tends to follow the collar and thereby wedge the snubber pawls 102 radially outward. However, such wedging movement does not occur at this time because the spring 95 opposes rearward movement of cam ring 89 which obstructs radial outward movement of the pawls. Accordingly the wedging ring 43 is held against movement relative to the housing as the disengaging spring 35 becomes compressed to its maximum extent in the Fig. 1b condition.

Booster operation

The driving and driven teeth 84 and 78 of the torque release clutch engage each other over sloping faces which have the effect of resolving the rotary driving force into components, one of which is rotational and directed in a plane normal to the axis of rotation and another of which disengaging and directed in a plane parallel to the axis of rotation. Under partial loads the booster clutch B responds to the disengaging component and moves from the fully meshed position of Figs. 8a and 12 to the partially separated position of Figs. 1b, 8b and 13. During such movement, the front plate 52 is held by the ball thrust bearing 57 while the intermediate plate 63 moves rearward, carrying with its rear plate 83 against the resistance of compression spring 95. The booster clutch remains in the Fig. 8b position as long as the load continues. The torque release clutch TR does not start to move in response to its disengaging component of force as soon as the booster clutch does, because the slope (60°) of the side faces 79 of the torque release teeth 78, as seen in Fig. 14, is steeper than the slope (45°) of the side faces 66 of booster teeth 61, as seen in Fig. 12.

This can best be understood from a mathematical analysis of the engaging surfaces of the sloping clutch teeth. In Fig. 18 is illustrated a fragmentary portion of a clutch tooth drawn as a free body diagram and showing the external forces acting thereon. S indicates the contacting sloping surface of the tooth; F is the force resulting from the torque load on the tool, said force acting in a plane normal to the axis of the tool; W is a force which resists downward movement of the tooth, said force acting in a plane parallel to the axis of the tool; R is the resultant of forces F and W; $Rv$ is the vertical component of R and is equal and opposite in value and direction to W; $Rh$ is the horizontal component of R and is equal and opposite in value and direction to F; and A is the angle of action between force F and surface S. If this tooth fragment is thought of as a wedge, acting upon the toothed surface which it engages, the equation of motion, F equals W tan (A plus $a$), will apply, wherein $a$ is the angle of sliding friction between the contacting teeth surfaces, and W equals $Rv$.

Applying this equation to the slopes 66 and 79, and with the value of F the same for both slopes, as well as the value $a$ since both teeth are made of similar material, it will be seen that the value of $Rv$ is greater for the slope 79 wherein the angle A is 60°, than the value of $Rv$ for slope 66 wherein the angle A is 45°. In other words it takes a smaller value of F (smaller torque) to produce the same disengaging component on slope 66 as on the slope 79. Since the instantaneous value of F acting on each slope is substantially the same, and since there is no substantial difference in the spring force opposing separation of the two clutches, the booster clutch will complete its operation before the torque or load becomes high enough to initiate separating movement of the torque release clutch.

Figures 8B, 8C, 8D, 8E, 13, 14, 18:
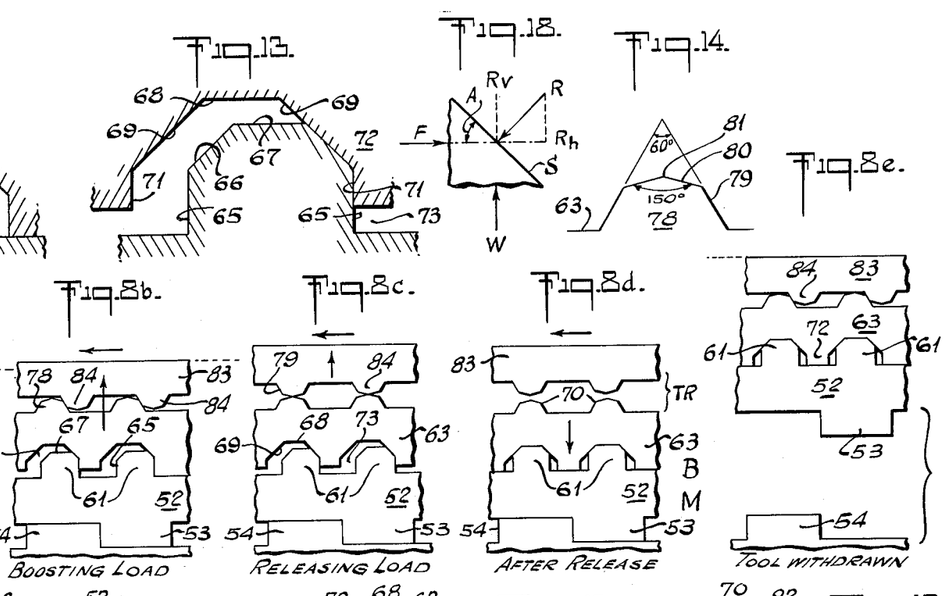
Fig. 13 is a view similar to Fig. 12 but with the grooved part of the booster clutch in raised relation to the tooth while driving the latter under load.
Fig. 14 is an enlarged view of one of the driven teeth of the torque release clutch.
Fig. 18 is a diagram illustrating the resolution of forces acting on a clutch tooth.

After the side face 65 of teeth 61 engages the side wall 71 of teeth 72, separating movement between intermediate plate 63 and front plate 52 stops, and the former continues to drive the latter, with the clutch parts again rotating in unison, in the position shown in Fig. 8b. The clutch elements remain in this position to tighten the driven bolt or nut (not shown) while the torque increases up to a certain value which depends upon the adjusted degree of compression of the spring 95.

Torque release operation

Figures 1A, 1B, 1C:
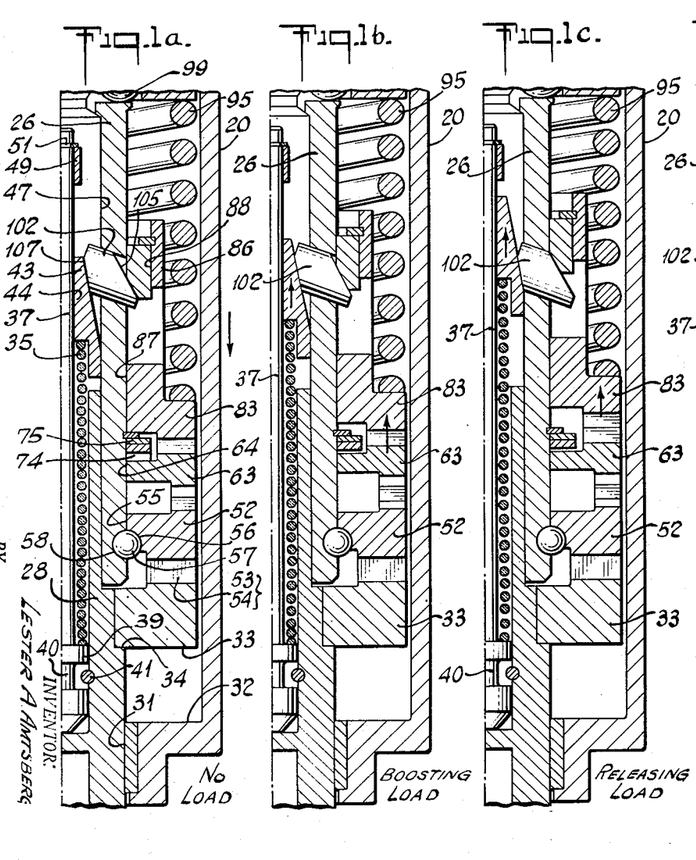
Fig. 1a is a longitudinal half-section of the clutch device shown in Fig. 1, with the machine casing pressed toward the work to engage the manual clutch, thereby driving the tool head, but under no-load or light-load condition.
Fig. 1b is a view similar to Fig. 1a but with the clutch device under partial load, whereby the booster clutch raises the driven plate of the torque release clutch and with it the driving plate against the pressure of a spring, the teeth on the plates remaining in full engagement.
Fig. 1c is a view similar to Fig. 1a but with the plates of the torque release clutch moved apart under increased load and just prior to the release of the driving connection between said plates.
Figures 1D, 1E:
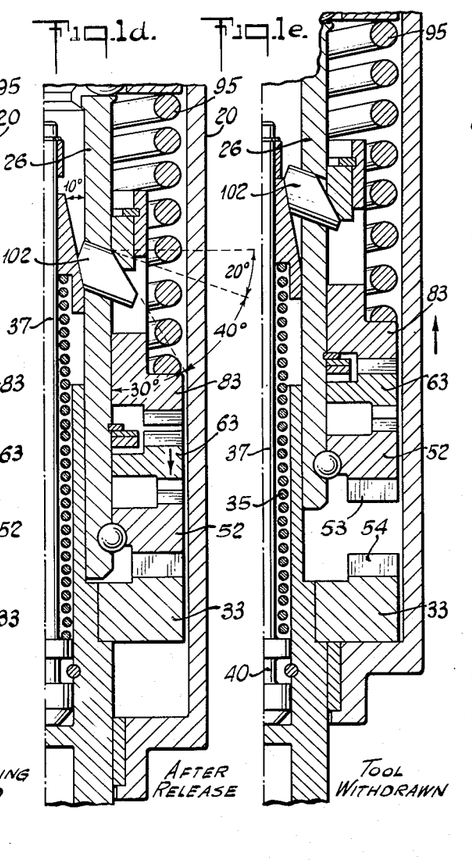
Fig. 1d is a view similar to Fig. 1a but with the driving plate of the torque release clutch held in raised position following release and the driven plate thereof restored to its no-load relation to the booster clutch, being the position of the parts after the driven bolt has been tightened to its predetermined limit but before the machine is removed from the work.
Fig. 1e is a view similar to Fig. 1a but with the casing of the machine withdrawn from the work, thereby opening the manual clutch and consequently releasing the snubber or hold-out device on the torque release clutch, thus permitting the plates of the latter to come together.

As the resistance to rotation of the tool head 29 approaches the maximum torque for which the tool is set, the torque release clutch TR moves from the position of Figs. 1b and 8b toward the position of Figs. 1c and 8c. At the start of such releasing movement, the inclined side face 79 of each driving tooth 84 rides over the corresponding face 79 of the driven tooth 78, moving the rear or driving plate 83 rearward against the increasing force of compression spring 95. Continued sliding engagement of faces 79 terminates when the teeth engage each other over the faces 80 which have considerably less slope. Such latter engagement continues only for an instant because the reduced slope increases the separating component of force $Rv$ which quickly causes the crests 81 of teeth to overide each other and thereby release the driving engagement of clutch TR.

Snubber operation

It will be noted that when the rear plate 83 is moved backward, the pawls 102 of the snubber are moved outwardly, i e., in a direction away from plunger rod 37, by indirect action of spring 35, and are maintained in such position so that bushing 89 is effective to keep the rearward extension 86 of driving plate 83 locked in position at the extent of its backward movement.

As soon as the crest 81 of teeth 78 are passed by the crest of teeth 84, as shown on Fig. 8c, the intermediate plate 63 is relieved of torsional stress and responds to the action of the curved washer spring 74 to return to its forward position as shown in Figs. 1d and 8d. Thereupon a clearance space is provided between the crest of teeth 78 and 84 so that the driving or rear plate 83 will continue to rotate free of contact with intermediate plate 63. Since the rear plate 83 is maintained in rearward position by the snubber arrangement, as heretofore discussed, and since it is no longer in driving contact with driving plate 63, rotation of the tool head 29 stops, and the driven bolt is relieved of torque, although the motor continues to rotate. At this time the inclined face 106 in bushing 89 has a tendency to cam the pawl 102 inwardly, and the pawl 102 in turn has a tendency to cam the wedging ring 43 forward but the force is insufficient to move ring 43 against the pressure of spring 35.

Restoration

To condition the tool for further operation, the operator lifts the tool away from the work piece, whereupon the compression spring 95 and disengaging spring 35 expand to project the tool head 29 forward relative to the housing 20, thereby opening the manual clutch M and seating the driven plate 33 thereof against the front wall 32 of the housing, as shown in Fig. 1e. Rearward movement of the housing relative to the tool head from the Fig. 1d to the Fig. 1e position is accompanied by rearward movement of the tubular drive shaft 26 and snubber pawls 102 relative to the plunger rod 37. The wedging ring 44 at first follows the pawls in such rearward movement, in response to the expansion of spring 35, but after traveling only a short distance the wedging ring is stopped by contact with the collar 49 on plunger rod 37, whereupon the spring 35 attains the maximum limit of its expansion and its minimum compressive force. Continued rearward movement of the pawls 102, relative to the wedging ring 43 as well as rod 37, withdraws the pawls toward the narrow end of the wedging ring. Thus the rearward and outward pressure of wedging ring 43 on pawls 102 is relieved, to the extent that the bushing 89, acting in response to spring 95 and through the inclined faces 106, 105, forces the pawls 102 inwardly, i. e., toward shaft 37. Expansion of spring 95 is accompanied by forward movement of the clutch driving plate 83, so that the elements of the torque release clutch will re-engage, as illustrated in Figs. 1e and 8e. Inward movement of the pawls 102 is permitted as a result of the cam action between faces 107 and 48 in shifting the wedging ring 43 forward, the latter in turn acting through disengaging spring 35 and plunger head 39 to project the tool head 29 from housing 20. The tool is now ready for another operating cycle as described above. Between cycles, the rear clutch plate 83 rotates with the motor, but the other clutch plates and the tool head do not rotate.

As compared with prior art devices of generally similar construction, the booster clutch B has the effect of maintaining the parts of the torque release clutch TR in their usual operative relation up to the point of engagement but of causing (and/or permitting) the driven plate 52 such clutch to move away from the driving plate following disengagement. As a result the driving teeth 84 of the torque release clutch may continue to revolve without engaging the driven teeth 78 whereas in prior devices continued rotation of the driving teeth to ratchet or deliver a series of rotative impacts. Such impacts are highly objectionable in that they drive the nut or bolt beyond the predetermined maximum torque of the tool. They also have a destructive effect on the clutch teeth, shorten the life of the parts and necessitate frequent readjustment of the torque setting.

By maintaining a complete separation between the clutch plates 83 and 63 as shown in Fig. 8d, the present invention eliminates the torsional impacts and the heavy frictional drag inherent in conventional release clutches and thereby makes it possible to take full advantage of a flywheel (on the rotor shaft of the motor), and of a higher clutch speed. The flywheel permits use of a much smaller motor, provided the motor is unhampered by clutch friction after release. One of the purposes of the higher clutch speed is to provide faster performance of the tool especially in mass production assembly work. Another object of the higher spindle speed is to reduce the torque impulse imposed on the operator by reducing the duration of the impulse. There is also a slight reduction in reactive torque value. For example in a tool having a rotor turning in the same direction as the spindle, if the gear ratio is 10 to 1, the torque reaction is 90% of delivered torque, whereas if the gear ratio is 4 to 1 the torque reaction is 75% of delivered torque.

The booster clutch B is so proportioned as to lift the driving plate 83 by a sufficient amount (from the Fig. 8b to the Fig. 8c position) as to insure running clearance between plates 83 and 63, even though some of the separation is lost, due to deflection and play in the snubber parts. A normal loss of separation is illustrated in Fig. 8d wherein the driving plate 83 has settled a slight distance below the corresponding position in Fig. 8c. Should the component parts of the snubber arrangement wear to the extent that plate 83 is not held clear of driven plate 63, then the tip faces 81 will ratchet over each other and prevent the working faces 79 from re-engaging until the tool is removed from the work. Any impacts delivered on the tip faces 80 would be less objectionable than if delivered on the steep side faces 79 of the teeth because of the lower torsional component of the impact.

The usual function of the tip faces 80, however, is to insure re-engagement of the clutch plates 83 and 63 should the teeth 84 and 78 land on top of each other when the snubber is released.

To regulate the torque at which the overload release clutch operates, and therefore the tightness of the driven bolt, the compressive force of spring 95 is altered by turning the adjusting collar 96.

The snubber arrangement of the present invention has an advantage over prior lock out devices of the latch type in that the rear plate 83 is grasped and held against forward movement during each increment of its rearward movement. Thus there is no need for such accuracy in dimensions as would be required if the clutch plate had to move through a precise (minimum and maximum) distance to operate a latch.

Another important advantage of the present snubber over prior hold out devices resides in its greater holding force and resistance to heavy loads. This advantage results from the angular arrangement of the pawl 102 with relation to the wedging ring 43, shaft bore 103 and cam ring 89 whereby the relatively light force of the spring 35, aided by friction, is more than sufficient to hold out the pawls and thereby hold back the driving clutch plate 83 against the pressure of the relatively heavy spring 95.

In a working embodiment of this invention the curved spring washer 74 has a pre-load of 2 pounds and builds up to 5 lbs. when the intermediate plate 63 is boosted to the position shown in Figs. 8b and 8c. The compression spring 95, in various tests has been adjusted over a range of 30 to 80 lbs. pre-load. At any adjusted pre-load the spring load increases 6 lbs. during booster action (lifting of plate 83 from the Fig. 8a to the Fig. 8b position) and an additional 11 lbs. upon disengagement (lifting of plate 83 from the Fig. 8b to the Fig. 8c position). Disengaging spring 35 in that device is pre-loaded to 7 lbs. in Fig. 1 and builds up to 10 lbs in Fig. 1a. The booster jaw lifts the plate 63 from the Fig. 8a to the Fig. 8b position during an early portion of the bolt tightening operation.

The torque value at this time of attainment of the Fig. 8b position is about 58% of the release torque setting of the clutch device, as attained in Fig. 8c.

The clutch teeth and clutch grooves are all symmetrically arranged to enable the tool to drive in either a clockwise or counterclockwise direction of rotation with release at the same predetermined value of torque. The reversible feature enables the tool to be used for tightening nuts, bolts or screws having a left hand thread whenever the occasion arises, without necessitating any resetting of the clutch in changing from right hand to left hand operation, or vice versa. This reversibility feature also enables the tool to be used for loosening the conventional fasteners with right hand threads, in which event the torque release clutch performs the function of preventing injury to the operator's wrist, which might otherwise occur in response to the torque reaction created by a frozen bolt or the like. The invention of course is not limited in its application to the driving of threaded fasteners, such as bolts, nuts and screws, but has general application to tools, machines, instruments and other apparatus which require a clutch mechanism arranged to insure sufficient torque as well as to prevent excessive torque for any specific adjustment, that is, to deliver predetermined torque within close limits.

If desired, the curved spring washer (Figs. 6 and 7) could be omitted, in which case the cam faces 80 on the torque release clutch would perform the function of moving the intermediate clutch plate 63 from the Fig. 8c to the Fig. 8d position. The omission of the spring 74 would impair the effectiveness of the tool, however, as it would result in the ratcheting of the teeth of the torque release clutch whenever the tool is held in an upside-down position.

Having now particularly described and ascertained the nature of my said invention and in what manner the same is to be performed, I declare that what I claim is:

1. A torque control clutch device comprising coaxially rotatable driving and driven members mounted upon a shaft, inter-engaging cam means on said members for the transmission of torque therebetween with an axial component of force tending to separate the members and cause relative axial travel therebetween, a spring opposing said component of force but yieldable gradually to permit separation, and means responsive to such separation for causing the members to be moved apart a greater distance than the amount of axial travel caused by the cam means.

2. A torque control clutch device comprising driving and driven clutch members mounted upon a shaft having inter-engaging teeth, yieldable means tending to hold the members in engagement for the transmission of torque through said teeth, cam means for exerting a force proportionate to the transmitted torque in a separating direction opposing said yieldable means, and auxiliary means separate from said cam means for causing additional separating movement following the action of said cam means.

3. A torque control clutch device comprising a driving and a driven plate mounted upon a shaft and having inter-engageable clutch teeth, a spring for holding the plates in driving engagement, disengaging means responsive to a predetermined torque transmitted through said plate for separating the plates against the pressure of said spring, and a booster arranged to cause additional movement of the clutch plates in a separating direction subsequent to the disengagement of the teeth.

4. A power operated tool for nut running and the like comprising a casing, and a torque control clutch mechanism enclosed within said casing, said clutch comprising a driving plate and a driven plate coaxially rotatable and having inter-engaging teeth for the transmission of torque therebetween, a booster arranged to shift the driven plate axially relative to the casing and toward the driving plate upon transmission of a relatively slight torque, cam means for moving the driving plate axially away from the driven plate upon transmission of a greater torque to cause release of the plates, said booster being arranged to hold the driven plate axially immovable relative to the casing during the transmission of such increased torque but to permit axial movement of the driven plate in a separating direction upon release of the driving connection between said plates, whereby the plates become separated by a greater distance than that caused by the cam means alone.

5. A torque control clutch mechanism comprising a rear clutch plate, an intermediate clutch plate driven thereby and a front clutch plate all coaxially rotatable and held in driving engagement by spring pressure, releasable clutch teeth between the rear and intermediate plates, cam elements between the intermediate and front plates, said cam elements being responsive to a relatively slight torque to move the intermediate plate axially toward engaged position with the rear plate, said teeth being responsive to increased torque to move the rear plate toward dis-engaged position, said cam elements being arranged to permit the intermediate plate to move axially away from the rear plate upon release of the driving connection therebetween, whereby to prevent repeated re-engagement of said clutch plates under impact.

6. A torque control clutch mechanism comprising coaxially rotatable driving and driven members mounted upon a shaft and, inter-engaging cam teeth on said members for the transmission of torque therebetween with an axial component of force tending to separate the members, means for supporting said clutch members in a casing with each of said members mounted for limited axial movement relative to the casing, a spring for yieldably opposing declutching movement of one member, and a means for opposing declutching movement of the other member relative to the casing under load, said means being releasable for declutching movement of the other member upon release of the driving connection between the members, whereby to increase the separation of the members beyond that produced by the cam teeth and thereby prevent repeated impacting.

7. In a tool of the class described, a casing, a torque responsive clutch mounted therein and comprising coaxially rotatable driving and driven plates arranged upon a driving shaft and having inter-engaging cam teeth for the transmission of torque therebetween with an axial component of force tending to separate the plates, an auxiliary clutch arranged to normally hold the driven plate in a fixed path of rotary movement relative to the casing, resilient means tending to hold the driving plate in a fixed path of movement relative to the casing but yieldable upon a predetermined torque to permit axial movement of the driving plate away from the driven plate, said auxiliary clutch being arranged to release its holding force on the driven plate in response to such axial movement of the driving plate.

8. In a tool of the class described a casing, a torque responsive clutch mounted therein and comprising coaxially rotatable driving and driven plates arranged upon a driving shaft and having inter-engaging cam teeth for the transmission of torque therebetween with an axial component of force tending to separate the plates, the driving plate being located rearwardly of the driven plate, resilient means resisting axial movement of the driving plate relative to the casing, auxiliary clutch means having teeth adapted for resisting forward movement of the driven plate relative to the casing, said resilient means permitting rearward movement of the driving plate in response to a predetermined torque to disengage the cam teeth, said auxiliary clutch teeth further adapted to be responsive to such disengagement to release holding force on the driven plate and permit it to move forward.

9. A torque control clutch mechanism comprising a driving plate and a driven plate mounted upon a driving shaft and having inter-engageable clutch teeth, said teeth having cam faces tending to separate the plates under load, means urging the driving plate toward the driven plate but yieldable in response to a predetermined torque to permit separation under the action of the cam teeth, and auxiliary means separate from the yieldable means for urging the driven plate toward the driving plate, said auxiliary means being torque responsive to permit the driven plate to move away from the driving plate upon interruption of the driving connection therebetween.

10. A torque control clutch mechanism according to claim 9 in which the yieldable means comprises a spring.

11. A torque control clutch mechanism according to claim 9 in which the engaging portions of the clutch teeth comprise cam faces at different angles the slope being steeper at the root of the tooth than at the tip whereby to require a greater torque to separate the plates when the teeth are fully engaged than when they are in contact at the tips.

12. A torque control clutch device comprising coaxially rotatable driving and driven clutch plates, each having a face parallel to a corresponding face on the other plate and having spaced teeth projecting from said face toward the other plate, a spring normally holding the clutch plates together with the crests of the teeth on one plate adjacent the face of the other plate, torque responsive means opposing the spring to cause separating movement between the plates whereby the crests of the teeth ride over each other, a locking device responsive to such separation for inhibiting re-engaging movement in response to the spring, and an auxiliary separating device operable upon release of the clutch teeth to cause additional separating movement of the clutch plates whereby the plates are held apart with their faces spaced a distance greater than the altitude of the teeth.

13. In a tool of the class described a driving clutch member, a driven clutch member, said members being coaxially rotatable and having inter-engaging teeth, a casing enclosing said members, one of said members being located forwardly relative to the other, a spring arranged to urge the rearward member forwardly toward engaging position, a holding device for the forward member normally preventing the latter from moving forward relative to the casing, the clutch teeth being cam shaped to cause separating movement under load by moving the rearward member against the spring while the forward member is held by the holding device, thereby compressing the spring, a locking device to prevent the spring from returning the rearward member upon release, said holding device being disabled upon release to permit the forward member to move forward relative to the casing and thereby increase the separation of the members beyond the amount caused by the cam teeth.

14. An overload release clutch comprising driving and driven clutch members having inter-engaging teeth, a spring urging the driving member toward engaging position relative to the driven member, a casing enclosing said clutch members and spring, torque responsive means opposing the spring for moving the driving member away from the driven member, a holding device for holding the driven member against movement relative to the casing while the torque responsive means is effective, a locking device for preventing the spring from moving the driving member toward the driven member upon disengagement of the clutch teeth, said holding device being torque responsive and released upon disengagement of the clutch teeth to permit the driven clutch member to move relative to the casing in a direction away from the driving clutch member, thereby increasing the separation of the clutch members.

15. In a power operated machine having a casing, a torque release clutch comprising coaxially rotatable driving and driven members, inter-engaging cam teeth on said members for transmitting torque therebetween with an axial component of force tending to separate the members, a spring arranged to act on one member and react against the casing to resist separation of said clutch members, said spring tending to move said one member into re-engagement following disengagement of the teeth, a lock arranged to prevent re-engaging movement of said one member, a booster arranged to move the other member a limited distance axially toward the one member, said booster being torque responsive to positively hold the other member in advanced position during torque transmission but permitting the other member to drop to retracted position upon release.

16. A torque control clutch device comprising coaxially rotatable driving and driven members, inter-engaging cam teeth on said members for the transmission of torque therebetween with an axial component of force tending to separate the members, a spring opposing said component of force but yieldable gradually to permit separation, a lock holding the members apart upon separation, said lock becoming effective upon relatively slight separating movement, and means for increasing the separating movement after the lock has become effective and while the lock continues to hold the members apart.

17. A torque control clutch device according to claim 16, in which the lock comprises a pawl engageable with an inclined surface on the driving member and urged toward the latter by resilient means.

18. In a device of the class described, a pair of plates coaxially arranged for the transmission of torque therebetween, one of said plates having a tooth projecting into a groove in the other plate, resilient means urging said plates toward each other, and tending to hold them in fully meshed relation, said tooth and the corresponding wall of the groove having inclined faces engageable with each other in the fully meshed condition and tending to cause partial separation of said plates by a cam action in response to torque and in opposition to the resilient means, said tooth and the corresponding wall of the groove having non-camming faces engageable with each other in response to such partial separation to provide a direct continuous drive.

19. In a tool of the class described, a pair of plates as described in claim 18 in which the tooth has an end face in a radial plane, a pair of inclined faces adjacent the end face and a pair of parallel faces, and in which the walls of the groove comprise a bottom face and a pair of inclined faces which fit the corresponding tooth faces in the fully meshed condition, said groove also comprising parallel walls spaced apart a greater distance than the parallel faces of the tooth, the inclined groove faces being longer than the inclined tooth faces to permit the latter to slide over the former.

20. A power operated tool for nut running and the like comprising a casing, and a torque control clutch mechanism enclosed within said casing, said clutch mechanism comprising a rear clutch plate, an intermediate clutch plate driven thereby and a front clutch plate, all coaxially rotatable and held in driving engagement by spring pressure, releasable clutch teeth between the rear and intermediate plates, cam elements between the intermediate and front plates, said cam elements being responsive to the torque transmitted therebetween to move the intermediate and rear plates together in a rearward direction relative to the front plate and casing, said cam elements being arranged for relative rotation to permit the intermediate plate to move forwardly subsequent to such rearward movement, a locking device separate from the cam elements for inhibiting retrograde forward movement of the rear clutch plate to hold the latter spaced from the intermediate plate, a manual clutch driven by the front plate and capable of release upon rearward movement of the casing relative to a work piece, and means responsive to the release of the manual clutch for disabling the locking device to permit the rear clutch plate to move forward under spring pressure, whereby said clutch teeth are held in spaced condition only so long as the manual clutch is engaged.

21. In a power tool, a casing having a rotatable tool-head in its front end and enclosing a tubular shaft disposed coaxially of the tool-head, a torque release clutch comprising a rear plate and an intermediate plate mounted on said shaft, said plates having inter-engaging teeth adapted to be released upon movement of the rear plate away from the intermediate plate in opposition to spring pressure, a front plate mounted on said shaft and cooperating with the intermediate plate to form a booster clutch, said booster clutch having cam elements responsive to the torque transmitted therebetween to move the intermediate and rear plates together in a rearward direction relative to the front plate and casing, a manual clutch arranged in series with the torque release clutch and booster clutch, said manual clutch having jaws adapted to engage each other upon manual pressure of the tool-head rearward relative to the casing, a snubber for inhibiting retrograde forward movement of said rear plate, said snubber comprising a pawl or detent mounted in a radial bore in the shaft, and engaging a locking surface carried by the rear plate, said snubber also comprising a wedge tapered rearwardly and engaging the detent, said wedge being urged rearward by resilient means to tend to cam the detent outwardly in locking relation to the surface carried by the rear plate, and means for automatically disabling the snubber upon release of the manual pressure of the tool-head relative to the casing.

22. A power tool, according to claim 21, in which the resilient means is arranged to urge the manual clutch toward open position at the same time that it urges the wedge rearwardly, said resilient means releasing a part of its force on the wedge when it is permitted to disengage the manual clutch whereby to permit the rear clutch plate to move forward.

23. A torque control clutch device comprising driving and driven clutch members mounted upon a shaft and having interengageable teeth, a booster clutch in front of said driven member and driven thereby, said booster clutch having interengaging cam means arranged to move the clutch members together rearwardly of the shaft upon transmission of torque through the clutch members and booster clutch, a sleeve connected to the driving member, latching means interposed between the shaft and sleeve to hold the driving member against retrograde forward movement following operation of the booster clutch, yieldable means for moving the driven clutch member forwardly while the driving member is held against forward movement, thereby effecting a separation between the clutch teeth, a manual clutch for effecting a rotatable connection between the booster clutch and a tool-head, the manual clutch having releasable jaws held in engagement by the application of pressure on the tool-head rearwardly relative to the shaft, and means for disabling the latching means to permit the driving member to move forwardly into re-engagement with the driven member, said disabling means being operative upon forward movement of the tool-head relative to the shaft whereby said latching means is released at the same time as the manual clutch, and resilient means for moving the driving member forward in a clutching direction relative to the driven member upon release of said latching means.

24. A torque control clutch device according to claim 23, in which the booster clutch comprises a driving and a driven plate, and in which said cam means comprise one or more recesses in one of said plates, and a cam element associated with each recess, said recess having its maximum depth at the center, and said cam element being arranged to permit the plates to lie close together when it registers with the center portion of the recess but to effect a separating movement of the plates upon disalignment of the cam element with respect to the center of the recess.

25. In a power tool, a casing having a rotatable tool-head at its front end and enclosing a tubular shaft disposed coaxially of the tool-head, a torque release clutch comprising a driving member mounted upon said shaft for relative longitudinal movement only, an intermediate member mounted upon said shaft for relative rotary movement with respect thereto and disposed in front of the driving member, said clutch having interengaging teeth, a booster clutch driven by the intermediate member and having cam means for moving the driving and intermediate member together rearwardly in response to a torque load transmitted through said clutches, a manual clutch arranged in series with the torque release clutch and booster clutch, said manual clutch having jaws which are normally disengaged but are adapted to engage each other upon application of manual pressure on the tool-head rearwardly relative to the shaft, and a snubber for inhibiting forward movement of the driving element until pressure is released from the tool-head, said snubber comprising a pawl or detent mounted in a bore in the shaft, said snubber also comprising a wedge tapered rearwardly and engaging the detent, said wedge being urged rearwardly by resilient means to tend to cam the detent outwardly in locking relation to the driving member, the booster clutch being arranged to relieve the rearward pressure against the intermediate member to permit forward movement of the intermediate member while the driving member is held by the snubber.

26. A power operated tool for driving bolts, screws and the like, comprising a casing, a shaft rotatably mounted in the casing, a tool-head projecting from the front end of the casing, yieldable means urging the tool-head forwardly with respect to the casing and shaft, said yieldable means being adapted to be overcome upon the application of manual pressure between the casing and the tool-head, a clutch member mounted on the shaft, a second clutch member mounted on the shaft, an intermediate clutch member mounted on the shaft between the first and second members and normally in driving engagement therewith, releasable clutch teeth between the first and intermediate members, cam means between the intermediate and second members, said cam means being torque responsive to move the first and intermediate members as a unit away from the second member, yieldable means constantly urging both the first and intermediate members toward the second member, and locking means separate from the cam means for holding the first member separated from the second member to permit the clutch teeth to disengage as the intermediate member moved toward the second member and means for disabling the locking means upon forward movement of the tool-head in response to the release of manual pressure.

27. A torque release tool, as described in claim 26, in which the locking means comprises a sleeve carried by the first clutch member, a detent mounted in a radial bore in the shaft and engageable with said sleeve, a plunger coaxially mounted in the shaft and extending forwardly from the detent and having a wedging portion at its rear end adapted to move the detent outwardly into locking engagement and a compression spring interposed between the plunger and the tool-head, said compression spring serving also as the yieldable means for urging the tool-head forwardly relative to the casing.

28. A power operated tool for driving bolts and the like, comprising a casing, a rotatable driving shaft therein, and a torque control mechanism enclosed within said casing, said mechanism comprising: A driving clutch member having a splined connection with the shaft, a driven clutch member rotatably mounted on the shaft in front of the driving clutch member, said clutch members being held in driving engagement by spring pressure, cam elements between the driving and driven members, said cam elements being responsive to the torque transmitted therebetween to move the driving clutch member in a rearward direction relative to the shaft and driven member to interrupt the driving connection therebetween, a locking device separate from the cam elements for inhibiting forward movement of the driving clutch member, a manual clutch driven by the driven clutch member, a tool-head driven by the manual clutch, said manual clutch being capable of release upon rearward movement of the casing relative to the tool-head, and means responsive to the release of the manual clutch for disabling the locking device to permit the clutch driving member to move forward under spring pressure, whereby said driving and driven clutch members remain disengaged only so long as the manual clutch is engaged.

References Cited in the file of this patent

UNITED STATES PATENTS

| | | |
|---|---|---|
| 2,366,841 | Dodge | Jan. 9, 1945 |
| 2,537,422 | Ridge | Jan. 9, 1951 |
| 2,683,512 | Boice | July 13, 1954 |
| 2,690,090 | Pederson | Sept. 28, 1954 |

FOREIGN PATENTS

| | | |
|---|---|---|
| 437,803 | Germany | 1926 |